United States Patent
Mansour et al.

(10) Patent No.: US 10,928,782 B2
(45) Date of Patent: Feb. 23, 2021

(54) VIRTUAL DETENT BEZEL DEVICE

(71) Applicant: Intel Corporation, Santa Clara, CA (US)

(72) Inventors: Anna-Marie Mansour, Seattle, WA (US); James Lundell, Portland, OR (US); Corrie Bates, Forest Grove, OR (US); Megan E. Hansen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 16/061,239

(22) PCT Filed: Dec. 23, 2015

(86) PCT No.: PCT/US2015/000315
§ 371 (c)(1),
(2) Date: Jun. 11, 2018

(87) PCT Pub. No.: WO2017/111794
PCT Pub. Date: Jun. 29, 2017

(65) Prior Publication Data
US 2018/0364650 A1   Dec. 20, 2018

(51) Int. Cl.
*G06F 3/0487* (2013.01)
*G04G 21/08* (2010.01)
(Continued)

(52) U.S. Cl.
CPC ............... *G04G 21/08* (2013.01); *G06F 3/01* (2013.01); *G06F 3/016* (2013.01); *G06F 3/0362* (2013.01)

(58) Field of Classification Search
CPC ...... G04G 21/00; G04G 21/08; G06F 3/0362; G06F 3/01; G06F 3/016
See application file for complete search history.

(56) References Cited

U.S. PATENT DOCUMENTS 5,790,114 A * 8/1998 Geaghan .............. G06F 3/0488
178/18.03
6,556,222 B1 * 4/2003 Narayanaswami .. G04G 9/0064
368/295
(Continued)

FOREIGN PATENT DOCUMENTS

| JP | 2000267797 A | 9/2000 |
| JP | 2000329875 A | 11/2000 |
| JP | 2005017012 A | 1/2005 |
| JP | 2015052543 A | 3/2015 |
| WO | WO-2017111794 A1 | 6/2017 |

OTHER PUBLICATIONS

"International Application Serial No. PCT/US2015/000315, International Search Report dated Sep. 22, 2016", 3 pgs.
(Continued)

*Primary Examiner* — Namitha Pillai
(74) *Attorney, Agent, or Firm* — Schwegman Lundberg & Woessner, P.A.

(57) ABSTRACT

System and techniques for a virtual detent bezel device are described herein, a configuration that specifies a detent pattern and an output pattern corresponding to the detent pattern may be received receiving by the virtual detent bezel device. A physical portion of the virtual detent bezel device may sense a rotational action of a user interacting with a physical portion of the virtual detent bezel device. The rotational action may be compared to a present rotational position to determine a rotational change. The rotational change may be thresholded against the detent pattern to determine that a detent is crossed. A haptic feedback device may be activated in response to determining that the detent is crossed. A portion of the output pattern that corresponds to the detent that is crossed may be output by the virtual detent bezel device.

18 Claims, 4 Drawing Sheets

(51) Int. Cl.
*G06F 3/01* (2006.01)
*G06F 3/0362* (2013.01)

(56) References Cited

U.S. PATENT DOCUMENTS

| | | | | |
|---|---|---|---|---|
| 7,778,118 | B2 | 8/2010 | Lyons et al. | |
| 9,047,009 | B2* | 6/2015 | King | G06F 1/1637 |
| 9,971,407 | B2* | 5/2018 | Holenarsipur | G06F 3/016 |
| 2013/0201219 | A1* | 8/2013 | Zhao | G06F 3/012 |
| | | | | 345/649 |
| 2014/0289668 | A1* | 9/2014 | Mavrody | G06F 3/04886 |
| | | | | 715/781 |
| 2015/0019227 | A1* | 1/2015 | Anandarajah | G10L 15/22 |
| | | | | 704/257 |
| 2016/0259488 | A1* | 9/2016 | Chan | G06Q 30/0643 |
| 2016/0285401 | A1* | 9/2016 | Murata | H02P 25/032 |

OTHER PUBLICATIONS

"International Application Serial No. PCT/US2015/000315, Written Opinion dated Sep. 22, 2016", 5 pgs.

"Samsung's Gear S2 smartwatch features circular face, rotating bezel control", Apple Insider, [Online]. Retrieved from the Internet: <URL: http://appleinsider.com/articles/15/08/31/samsungs-gear-s2-smartwatch-fetaures-circular-face-rotating-bezel-control>, (Aug. 31, 2015), 2 pgs.

"TouchSense Programmable Rotary Modules", Immersion. (Copyright: 2004), 1-8.

Lo, Michael, "Bezel for Moto 360 Small Watch with Wheel Control Function", Kick Starter, [Online]. [Archived Oct. 4, 2016]. Retrieved from the Internet: <URL: https://www.kickstarter.com/projects/47434543/bezel-for-moto-360/description>, (Accessed: Oct. 4, 2016), 14 pgs.

* cited by examiner

VIRTUAL DETENT BEZEL DEVICE

CLAIM OF PRIORITY

This patent application is a U.S. National Stage Application under 35 U.S.C. 371 from International Application No. PCT/US2015/000315, filed Dec. 23, 2015, published as WO 2017/111794, which is incorporated herein by reference.

TECHNICAL FIELD

Embodiments described herein generally relate to computer input devices and more specifically to a virtual detent bezel device.

BACKGROUND

A bezel is a bordering portion of an object that has typically been used to hold something, such as a surface crystal in the case of watches, or a gemstone in the case of rings. With respect to watches, or similar devices, the generally circular bezel may be a swivel, or rotational, bezel in which a portion of the bezel may rotate about the device to which it belongs. In some examples, the rotational bezel may include mechanical detents, or areas that cause a physical "click" sound or sensation as the bezel moves. In such a device, a piece of the bezel touches a piece of the device case to impede the rotation of the bezel and provide tactile feedback to the user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
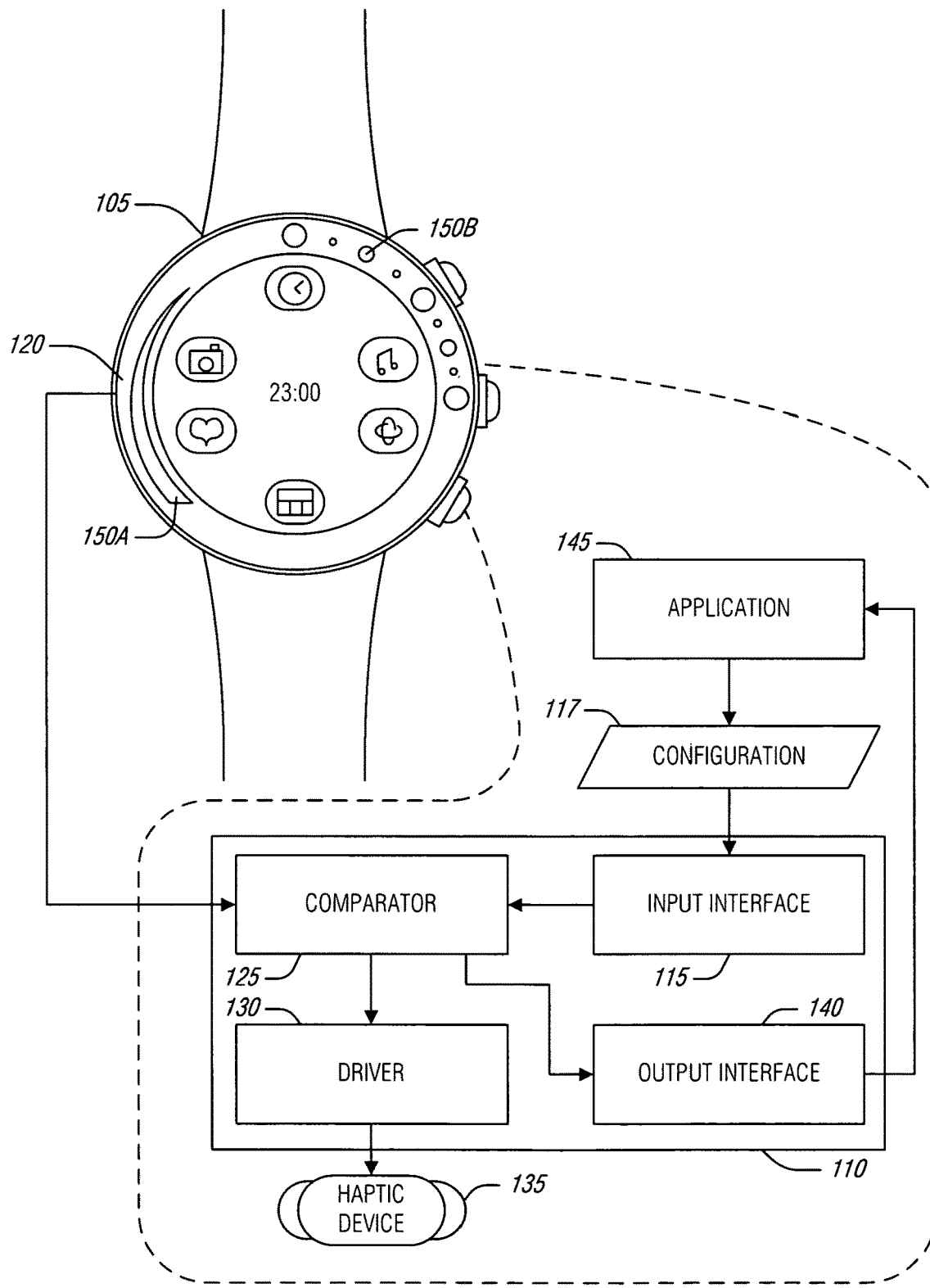
FIG. 1 is a block diagram of an example of a device with a virtual detent bezel device, according to an embodiment.

Devices, such as smart watches, typically rely on a touch screen to interact with the UI. A physical rotating bezel provides an additional input mechanism to which users are generally acclimated. In some cases, the rotational bezel may provide a more precise way of interacting with the device, including providing a natural tactile feedback to the user.

Mechanical rotational bezels exhibit one pre-defined tactile feel (e.g., set of detents) for turning. Thus, these bezels generally have one level, of granularity (e.g., sixty "clicks" around a watch face). This configuration typically works well for a single-function bezel, such as those used for timing in a diving watch or tachymeter.

While previous mechanical bezels may be appropriate for single function interactions with a smart device, they typically are underutilized in a multifunction device where different levels of interaction are called for. For example, while the physical detent pattern may be configured to the sixty minute hour for timing functions, it may provide no relevant feedback, or perhaps detrimental feedback, when used for a four option function, such as selecting an application. Further, it may provide too coarse a level of feedback for continuous functions, such as volume control.

Combining a bezel with a multifunction device, such as a smart watch, the bezel may be used for a variety of functional inputs. For example, the user may want to set a timer, which might involve very granular setting of seconds (and corresponding "click" tactile feedback at each second). In another example, a user might be choosing from a small set of options, such as selecting an application or a playlist selection, where fewer detents, or a varying number of detents depending on the list, are involved. In a further example, the user may expect a detent-free scrolling or adjustment. This could be beneficial in a meeting setting where one might not want the noise from a clicking bezel to attract attention from others.

To address the issues discussed above with respect to current rotational bezels with mechanical detents, a virtual detent bezel device may be used. Such a device includes a physical portion of a bezel and combines it with an electronically controlled haptic feedback device to simulate the tactile feedback of a mechanical bezel. Having a dynamic, programmable way of assigning the click spacing (via haptics) allows one physical rotating bezel to provide appropriate feedback for a wider set of on-screen use cases, based on the user task and context at hand.

An example of an interaction using the virtual detent bezel device may include displaying a user interface (UI) that shows several selectable items on the screen. The user may turn the bezel, receiving a haptic "click" as each detent is approached, or crossed, (e.g., the bezel detecting the turn direction and told to "click" a certain detent points determined by, for example, dividing the bezel rotation into 60 clicks, 5 clicks, etc.). A haptic motor on the device vibrates according to instructions to simulate the desired "click" type. The UI is then updated to reflect the user's input commands via the bezel. Simulating the clicks using electronically controlled haptics rather than mechanical haptics allows for bezel feedback adjustments based on the user task or context. This enables eyes-free interaction, greater precision in user input, or quick context-switching of UI elements.

FIG. 1 is a block diagram of an example of a device 100 with a virtual detent bezel device 105, according to an embodiment. The virtual detent bezel device 105 includes an external physical portion 120 and an internal portion 110. The internal portion 110 includes an input interface 115, a comparator 125, a driver 130, and an output interface 140. In an example, the virtual detent bezel device 105 appears as any other input mechanism, such as a touch-screen, mouse, scroll, wheel, etc., in that it is associated with a UI element (e.g., a scroll-pane) and provides user input. This is different than, for example, an application 145 controlled haptic feedback when a user touches a UI element. In the first example, the application software 145 need not control, nor care how control occurs of, the haptic device. In the second example, the application 145 itself is controlling the haptic device.

The input interface 115 is arranged to receive a configuration 117 that specifies a detent pattern and an output pattern corresponding to the detent pattern. In an example, the detent pattern is specific, specifying a degree from top, for example, where a detent is located. In an example, the detent pattern is formulaic, such as specifying that a detent occurs every five degrees, or a fraction of an arc (e.g., every ⅟₃₆₀, or ⅟₉₀ for the first ninety degrees of rotation, etc.). In an example, the configuration 117 specifies the detent pattern via naming a function. For example, the function may be "application selection" and five applications are provided. The detent pattern is then three hundred and sixty divided by the number of applications. In an example, the function may be audio volume with a hundred different levels. Again, the whole circle of rotation may be divided by one hundred to determine the detent positions.

In an example, the detent pattern includes at least two different degrees of detent. A degree of detent indicates the amount of response a user would feel in a mechanical detent. For example, degrees high, medium, and low may be defined for different detents in the detent pattern. A high detent corresponds to a larger physical obstruction in a mechanical detent than a medium or low degree of detent. In an example, a degree of detent corresponds to a haptic response from the haptic feedback device 135. Thus, a high degree of detent will differ from a low degree of detent by at least one of intensity of the haptic response or length of the haptic response.

In an example, the detent pattern is irregular over an arc of rotation of the virtual detent bezel device. The irregularity is as opposed to the regular patterns discussed above (e.g., evenly dividing the arc between a number of detents). The irregularity may be between adjacent detents, such that the spacing of the detents differs between a previous detent and a subsequent detent. Such irregular detentation (e.g., detent usage) may provide unique user interfaces, such as allowing for "dangerous" options to be separated from other options by a greater space, signaling to the user the importance of the selection.

In an example, the output pattern provides a degree of rotation. That is, the output pattern indicates that the virtual bezel device 105 will output the degree to which the physical portion 120 was rotated. In an example, the output pattern provides a number of detents crossed. In an example, the output pattern provides a selection label. This may operate similarly to the "select" form tag of HTML, where the selected element is returned by the virtual detent bezel 105.

In an example, the output pattern includes an application call-back. In this example, the application 145, when enabling the virtual bezel device 105 as an input device, specifies a method, function, object, etc., to receive the output of the output interface 140. Thus, a numerical output may be directly converted into a UI effect without additional configuration or accommodation by the application 145. The following table illustrates some of the interactions that may be accomplished with the virtual detent bezel device 105 or its application call-back:

| Function | Description |
|---|---|
| Horizontal Scrolling | Turning the physical portion 120 moves the screen left or right |
| Vertical Scrolling | Turning the physical portion 120 highlights items up or down |
| Zooming | Turning the physical portion 120 zooms in or zooms out |
| Course-Grained Tuning | Adjust settings/information with discrete number of on-screen options |

-continued

| Function | Description |
|---|---|
| Fine-Grained Tuning | Fine tune settings with smooth adjustment (e.g., volume, brightness) |
| Selection of Objects on Screen | Tap or force touch (e.g., click) the physical portion 120 to select UI object |

The bezel portion is arranged to sense a rotational action of a user interacting with the physical portion 120 of the virtual detent bezel device 105. This bezel portion includes a (not shown) physical detector to measure the rotational position or change of the physical portion 120. In an example, the bezel portion is the same as the physical 120. For example, instead of actually rotating, the physical portion 120 may be a low-friction capacitive touch surface. The user may grip the surface and twist, as if it rotated, without any actual rotation occurring. However, the movement of the user's fingers may be tracked, indicating a degree of rotation performed. In either case, however, the user may perform a rotational movement and the bezel portion measures the rotational action of the user. In an example, the physical portion of the virtual detent bezel device physically rotates with respect to a housing of a machine to which it is attached to receive the rotational action of the user.

In an example, the physical portion includes a display. Such as display may include a set of lights (e.g., light emitting diodes placed around the bezel), or a raster display. In an example, receiving the configuration 117 includes displaying a set of visual elements 150 on the physical portion 120 that correspond to detents in the detent pattern. An example, may include visual element 150A, which may indicate a continuous detent decreasing in degree as the physical portion 120 is rotated clockwise. Another example may include the set of visual elements 150B, which mark detent positions with a light calibrated to a diameter or brightness corresponding to the detent degree. In an example, the display is updated such that detent indications are static with respect to the device 100 orientation and indifferent to the rotational position of a rotating physical portion 120. In an example, the visual elements 150 may change in color, or other indications to as specified in the detent pattern.

In an example, the physical portion 120 is arranged to sense at least one of a click or a touch on the physical portion of the virtual detent bezel device. Such an interaction is analogous to clicking a mouse button, or tapping on a touch screen. In an example, the clock or touch interaction may invoke an application call-back, e.g., by the output interface 140, in response to the sensing to select a user interface element. Thus, the user may adjust the volume of music played by the device 100 and click to mute or un-mute the playback.

The comparator 125 is arranged to compare the rotational action performed by the user on the physical portion 120 to a present rotational position of the physical portion 120 to determine a rotational change. The comparator 125 may then threshold the rotational change against the detent pattern to determine that a detent is crossed. Thus, the comparator 125 incorporates the detent pattern into the rotation of the physical portion 120 to determine when a detent should be activated.

The driver 130 is arranged to activate the haptic feedback device 135 in response to determining that the detent is crossed. Thus, as the comparator 125 determines when a detent is crossed, the driver 130 causes a haptic response to simulate the detent to the user. In an example, the driver 130 accepts parameters of the haptic response (e.g., intensity, duration, pattern such as pulsing, rising/falling intensity, etc.) from the input interface 115 (e.g., via the detent pattern). In an example, the driver 130 accepts haptic response parameters directly from the comparator 125. In an example, the haptic feedback device 135 is incorporated into the virtual detent bezel device 105. In this example, the assembly of the bezel portion (e.g., including the physical portion 120) or the internal portion 110 includes its own haptic device 135. In an example, the haptic feedback device is external to the virtual detent bezel device 105. In this example, the haptic device 135 is included in the device 100, but not part of the virtual bezel device 105 itself. For example, the battery-based vibrating motor of the device 100, perhaps used for alarms, message notifications, etc., may also be used by the virtual detent bezel device 105.

The output interface 140 is arranged to output a portion of the output pattern corresponding to the detent that is crossed. As noted above, the detent pattern and output pattern operate to define how the virtual detent bezel devices act. The detent pattern, from the configuration 117, provides the haptic feedback or display definitions of the detents. The output pattern provides the results of the user interaction to the application 145 (e.g., operating system, music player, messaging, etc.).

The virtual detent bezel device 105 described herein provides a multi-function tactile input device to the user that is unavailable with current bezel devices. By increasing the usefulness of the physical inputs available to space constrained devices such as smart watches, the virtual detent bezel device 105 opens up new UI interactions for application developers and users to exploit.

Figure 2:
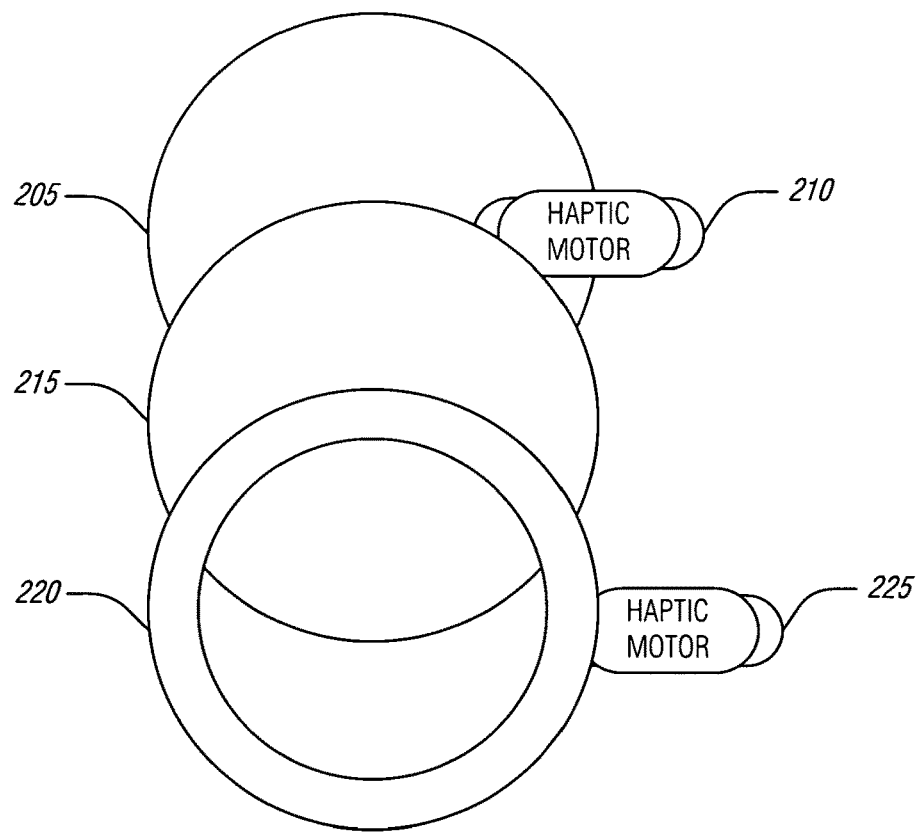
FIG. 2 illustrates a block diagram of an example of an assembly for a virtual detent bezel device, according to an embodiment.

FIG. 2 illustrates a block diagram of an example of an assembly for a virtual detent bezel device 200, according to an embodiment. The virtual detent bezel device 200 may include device electronics 205 (e.g., a computer systems such as a system-on-a-chip (SoC), battery, display driver, etc.), a display layer 215 (e.g., a liquid crystal display, an organic light emitting diode display, etc.), and a physical bezel portion 220 (e.g., physical rotating bezel or touch device).

As illustrated, the rotating bezel ring 220 is disposed in front of the display 215 and is connected to the electronics 205. As the bezel 220 rotates, the rotational change in the bezel 220 is detected. The virtual detent bezel device 200 drives a haptic motor of the device 200 in response to crossing configured virtual detents. In an example, the haptic motor used is a device-wide haptic motor 210, which may be used for other functions, such as alerting the user to an incoming message. In an example, the virtual detent bezel device 200 includes a bezel haptic motor 225 that is part of the virtual detent bezel device 200 and generally used exclusively by the virtual detent bezel device 200. As noted above, as the bezel 220 rotates, the haptic motor 210 or 225 vibrates to simulate the mechanical notched clicking of fixed mechanical bezel detents.

Figure 3:
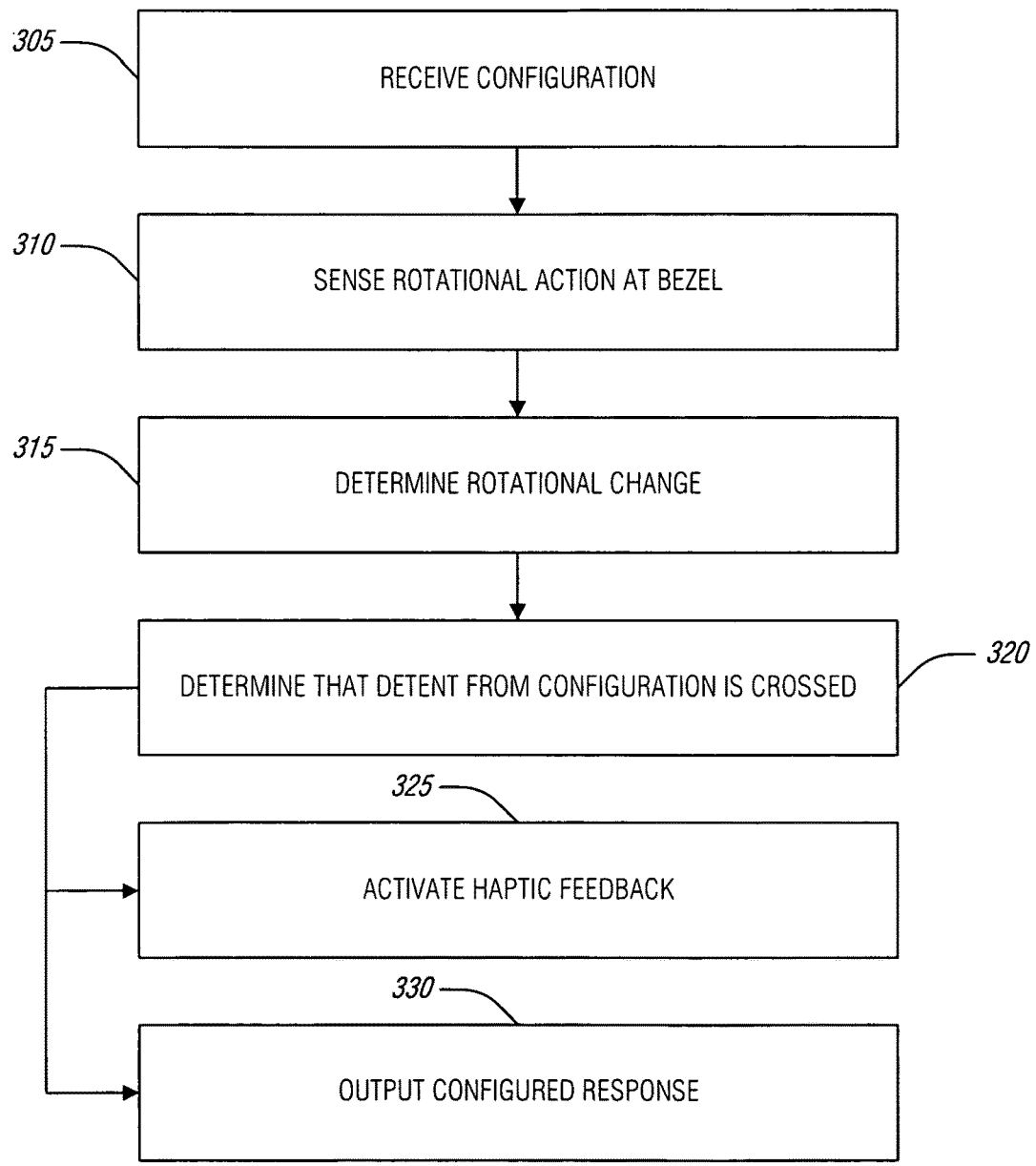
FIG. 3 illustrates an example of a method for a virtual detent bezel device, according to an embodiment.

FIG. 3 illustrates an example of a method 300 for a virtual detent bezel device, according to an embodiment. The operations of the method 300 are performed by computer hardware, such as that described herein with respect to FIGS. 1-2 and 4 (e.g., circuit sets).

At operation 305, a configuration that specifies a detent pattern and an output pattern corresponding to the detent pattern is received, e.g., at an input interface of the virtual detent bezel. The configuration may be provided by an operating system, an application, another piece of hardware, etc. For example, in a user interface element denoted with a tagged language, such as XML, the virtual bezel device may be included via a tag such as <input type=bezel detent-pattern=60 min>. This directive from the application may be read by a windowing manager, or the like, of the operating system. The operating system may then provide the configuration to the virtual bezel device via input port. Because the application may include a number of such tags in a single user interface (e.g., to scroll in a panel, to select a menu option when the menu is activated, etc.), the virtual detent bezel device may be reconfigured quite quickly as user interface elements gain and lose focus.

In an example, the detent pattern includes at least two different degrees of detent, such as a large detent and a small detent. A degree of detent corresponds to a haptic response from the haptic feedback device. For example, a large detent results in a greater magnitude of vibration or a greater length of vibration time. In an example, the detent pattern is irregular over an arc of rotation of the virtual detent bezel device. For example, the detent pattern may include detents through the first ninety degrees of rotational and be free of detents otherwise. In an example, the irregular pattern of detents involves non-uniform rotational angles between a least some of the detents next to each other.

In an example, the output pattern provides a degree of rotation. For example, the virtual detent device outputs the angle of the rotation (e.g., ninety degrees, one hundred and eighty degrees, etc.) In an example, the output pattern provides a number of detents crossed. For example, if three detents are crossed, the virtual bezel device outputs "three." In an example, the output pattern provides a label corresponding to either the detents crossed or the final detent position indicated by the bezel. For example, the detent pattern may include labels of clock, calendar, music, and alarm corresponding to four positions of the bezel. The user may rotate through clock and calendar to rest on music. The output pattern may specify that all of clock, calendar, and music are returned as output, or that only music is returned as output.

In an example, the output pattern includes an application call-back. The application call-back is a hook into the application. In this example, the output of the virtual detent bezel device is provided directly into an application (e.g., function, method, etc.). In an example, the application call-back is at least one of a horizontal scroll or a vertical scroll. In this example, the call back scrolls a UI pane as the bezel is rotated. In an example, the application call-back is a zoom.

At operation 310, a rotational action of a user interacting with a physical portion of the virtual detent bezel device is sensed. In an example, the physical portion of the virtual detent bezel device physically rotates with respect to a housing of a machine to which it is attached to receive the rotational action of the user. In an example, the physical portion of the bezel is touchable, or graspable by the user but does not rotate. Instead, the physical portion senses (e.g., via capacitive touch) the user moving around the physical portion as if it rotates (e.g., fingers grasping the physical portion and then sliding over the surface in a rotational motion).

In an example, the physical portion includes a display. As noted above, the display may include lights, or more complex display elements, that, for example, visually indicate the configured detent positions. Thus, in an example, receiving the configuration includes displaying a set of visual elements on the physical portion that correspond to detents in the detent pattern.

In an example, the method 300 may be extended by sensing at least one of a click or a touch on the physical portion of the virtual detent bezel device. Such an interaction may invoke an application call-back in response to the sensing to select a user interface element. For example, the virtual detent bezel may operate as a mouse scroll wheel in a desktop computer analogue in a smart watch. While the rotational aspect of the bezel corresponds to the rotational aspect of the mouse scroll wheel, clicking the bezel corresponds to pushing down, or clicking, the scroll wheel. Such clicking may be used to select a choice indicated by the rotating bezel portion.

At operation 315, the rotational action is compared to a present rotational position to determine a rotational change. In an example, such comparison may involve absolute positioning, and thus is determined by determining a rotational orientation of the physical portion of the bezel and an underlying device position. In an example, the comparison may involve determining the angle through which the bezel passed. In an example, these two comparison mechanisms may be combined. For example, the absolute positioning may determine that the bezel started at twenty two degrees and moved through a forty degree arc to arrive at a position of sixty two degrees. Of course other systems, such as radians may be used. In an example, a point on the bezel may be selected at a starting, or zeroed, point. In this example, the rotational change may be measured with respect to this starting point. In an example, the starting point is at the twelve-o-clock position, or its equivalent, on the watch face.

At operation 320, the rotational change may be thresholded against the detent pattern to determine that a detent is crossed. For example, the detent configuration may indicate that a detent is every ten degrees or every 0.5 radians or some other measurement. Thus, when the bezel has rotated ten degrees, the threshold is passed and it is determined that a detent is crossed.

At operation 325, a haptic feedback device is activated in response to determining that the detent is crossed. In an example, the haptic feedback device is incorporated into the virtual detent bezel device. In an example, the haptic feedback device is external to the virtual detent bezel device.

At operation 330, a portion of the output pattern corresponding to the detent that is crossed is output, e.g., at an output interface of the virtual detent bezel device. As noted above, the precise nature of the output is provided in the output pattern.

Figure 4:
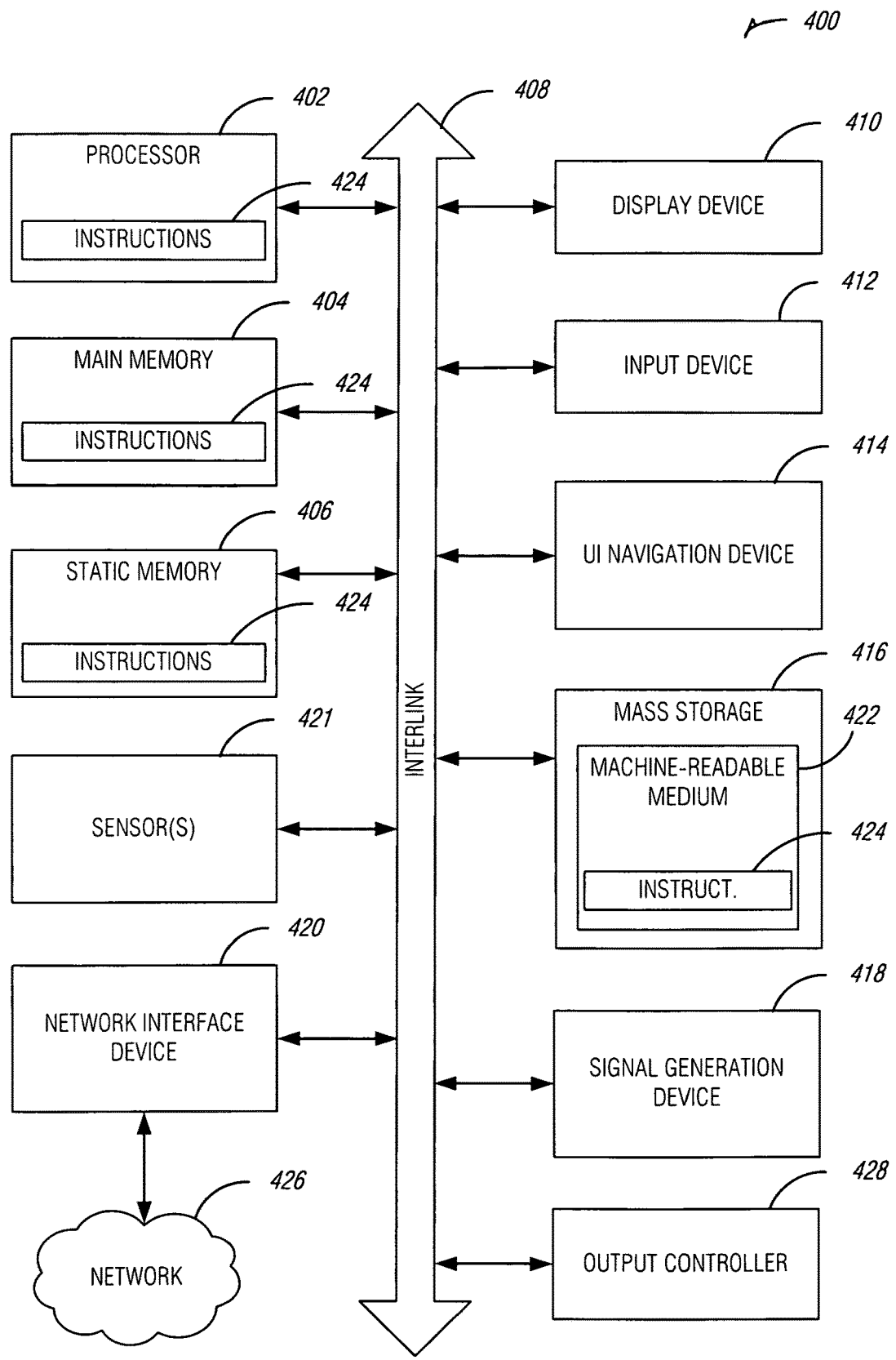
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

Additional Notes & Examples

Example 1 is a virtual detent bezel device, the device comprising: an input interface to receive a configuration that specifies a detent pattern and an output pattern corresponding to the detent pattern; a bezel portion to sense a rotational action of a user interacting with a physical portion of the virtual detent bezel device; a comparator to: compare the rotational action to a present rotational position to determine a rotational change; and threshold the rotational change against the detent pattern to determine that a detent is crossed; a driver to activate a haptic feedback device in response to determining that the detent is crossed; and an output interface to output a portion of the output pattern corresponding to the detent that is crossed.

In Example 2, the subject matter of Example 1 optionally includes wherein the haptic feedback device is incorporated into the virtual detent bezel device.

In Example 3, the subject matter of any one or more of Examples 1-2 optionally include wherein the haptic feedback device is external to the virtual detent bezel device.

In Example 4, the subject matter of any one or more of Examples 1-3 optionally include wherein the detent pattern includes at least two different degrees of detent, wherein a degree of detent corresponds to a haptic response from the haptic feedback device.

In Example 5, the subject matter of any one or more of Examples 1-4 optionally include wherein the detent pattern is irregular over an arc of rotation of the virtual detent bezel device.

In Example 6, the subject matter of any one or more of Examples 1-5 optionally include wherein the output pattern provides a degree of rotation.

In Example 7, the subject matter of any one or more of Examples 1-6 optionally include wherein the output pattern provides a number of detents crossed.

In Example 8, the subject matter of any one or more of Examples 1-7 optionally include wherein the output pattern includes an application call-back.

In Example 9, the subject matter of Example 8 optionally includes wherein the application call-back is at least one of a horizontal scroll or a vertical scroll.

In Example 10, the subject matter of any one or more of Examples 8-9 optionally include wherein the application call-back is a zoom.

In Example 11, the subject matter of any one or more of Examples 1-10 optionally include wherein the bezel portion is to sense at least one of a click or a touch on the physical portion of the virtual detent bezel device, and wherein the comparator is to invoke an application call-back in response to the sensing to select a user interface element.

In Example 12, the subject matter of any one or more of Examples 1-11 optionally include wherein the physical portion of the virtual detent bezel device physically rotates with respect to a housing of a machine to which it is attached to receive the rotational action of the user.

In Example 13, the subject matter of any one or more of Examples 1-12 optionally include wherein the physical portion includes a display, and wherein receiving the configuration includes displaying a set of visual elements on the physical portion that correspond to detents in the detent pattern.

Example 14 is a method for a virtual detent bezel device, the method comprising: receiving, at an input interface of a virtual detent bezel device, a configuration that specifies a detent pattern and an output pattern corresponding to the detent pattern; sensing a rotational action of a user interacting with a physical portion of the virtual detent bezel device; comparing the rotational action to a present rotational position to determine a rotational change; thresholding the rotational change against the detent pattern to determine that a detent is crossed; activating a haptic feedback device in response to determining that the detent is crossed; and outputting, at an output interface of the virtual detent bezel device, a portion of the output pattern corresponding to the detent that is crossed.

In Example 15, the subject matter of Example 14 optionally includes wherein the haptic feedback device is incorporated into the virtual detent bezel device.

In Example 16, the subject matter of any one or more of Examples 14-15 optionally include wherein the haptic feedback device is external to the virtual detent bezel device.

In Example 17, the subject matter of any one or more of Examples 14-16 optionally include wherein the detent pattern includes at least two different degrees of detent, wherein a degree of detent corresponds to a haptic response from the haptic feedback device.

In Example 18, the subject matter of any one or more of Examples 14-17 optionally include wherein the detent pattern is irregular over an arc of rotation of the virtual detent bezel device.

In Example 19, the subject matter of any one or more of Examples 14-18 optionally include wherein the output pattern provides a degree of rotation.

In Example 20, the subject matter of any one or more of Examples 14-19 optionally include wherein the output pattern provides a number of detents crossed.

In Example 21, the subject matter of any one or more of Examples 14-20 optionally include wherein the output pattern includes an application call-back.

In Example 22, the subject matter of Example 21 optionally includes wherein the application call-back is at least one of a horizontal scroll or a vertical scroll.

In Example 23, the subject matter of any one or more of Examples 21-22 optionally include wherein the application call-back is a zoom.

In Example 24, the subject matter of any one or more of Examples 14-23 optionally include sensing at least one of a click or a touch on the physical portion of the virtual detent bezel device and invoking an application call-back in response to the sensing to select a user interface element.

In Example 25, the subject matter of any one or more of Examples 14-24 optionally include wherein the physical portion of the virtual detent bezel device physically rotates with respect to a housing of a machine to which it is attached to receive the rotational action of the user.

In Example 26, the subject matter of any one or more of Examples 14-25 optionally include wherein the physical portion includes a display, and wherein receiving the configuration includes displaying a set of visual elements on the physical portion that correspond to detents in the detent pattern.

Example 27 is at least one machine readable medium including instructions that, when executed by a machine, cause the machine to perform any of the methods 14-26.

Example 28 is a system comprising means to perform any of the method 14-26.

Example 29 is at least one machine readable medium including instructions for a virtual detent bezel device, the instructions, when executed by a machine, cause the machine to perform operations comprising: receiving, at an input interface of a virtual detent bezel device, a configuration that specifies a detent pattern and an output pattern corresponding to the detent pattern; sensing a rotational action of a user interacting with a physical portion of the virtual detent bezel device; comparing the rotational action to a present rotational position to determine a rotational change; thresholding the rotational change against the detent pattern to determine that a detent is crossed; activating a haptic feedback device in response to determining that the detent is crossed; and outputting, at an output interface of the virtual detent bezel device, a portion of the output pattern corresponding to the detent that is crossed.

In Example 30, the subject matter of Example 29 optionally includes wherein the haptic feedback device is incorporated into the virtual detent bezel device.

In Example 31, the subject matter of any one or more of Examples 29-30 optionally include wherein the haptic feedback device is external to the virtual detent bezel device.

In Example 32, the subject matter of any one or more of Examples 29-31 optionally include wherein the detent pattern includes at least two different degrees of detent, wherein a degree of detent corresponds to a haptic response from the haptic feedback device.

In Example 33, the subject matter of any one or more of Examples 29-32 optionally include wherein the detent pattern is irregular over an arc of rotation of the virtual detent bezel device.

In Example 34, the subject matter of any one or more of Examples 29-33 optionally include wherein the output pattern provides a degree of rotation.

In Example 35, the subject matter of any one or more of Examples 29-34 optionally include wherein the output pattern provides a number of detents crossed.

In Example 36, the subject matter of any one or more of Examples 29-35 optionally include wherein the output pattern includes an application call-back.

In Example 37, the subject matter of Example 36 optionally includes wherein the application call-back is at least one of a horizontal scroll or a vertical scroll.

In Example 38, the subject matter of any one or more of Examples 36-37 optionally include wherein the application call-back is a zoom.

In Example 39, the subject matter of any one or more of Examples 29-38 optionally include wherein the operations include sensing at least one of a click or a touch on the physical portion of the virtual detent bezel device and invoking an application call-back in response to the sensing to select a user interface element.

In Example 40, the subject matter of any one or more of Examples 29-39 optionally include wherein the physical portion of the virtual detent bezel device physically rotates with respect to a housing of a machine to which it is attached to receive the rotational action of the user.

In Example 41, the subject matter of any one or more of Examples 29-40 optionally include wherein the physical portion includes a display, and wherein receiving the configuration includes displaying a set of visual elements on the physical portion that correspond to detents in the detent pattern.

Example 42 is a system for a virtual detent bezel device, the system comprising: means for receiving, at an input interface of a virtual detent bezel device, a configuration that specifies a detent pattern and an output pattern corresponding to the detent pattern; means for sensing a rotational action of a user interacting with a physical portion of the virtual detent bezel device; means for comparing the rotational action to a present rotational position to determine a rotational change; means for thresholding the rotational change against the detent pattern to determine that a detent is crossed; means for activating a haptic feedback device in response to determining that the detent is crossed; and means for outputting, at an output interface of the virtual detent bezel device, a portion of the output pattern corresponding to the detent that is crossed.

In Example 43, the subject matter of Example 42 optionally includes wherein the haptic feedback device is incorporated into the virtual detent bezel device.

In Example 44, the subject matter of any one or more of Examples 42-43 optionally include wherein the haptic feedback device is external to the virtual detent bezel device.

In Example 45, the subject matter of any one or more of Examples 42-44 optionally include wherein the detent pattern includes at least two different degrees of detent, wherein a degree of detent corresponds to a haptic response from the haptic feedback device.

In Example 46, the subject matter of any one or more of Examples 42-45 optionally include wherein the detent pattern is irregular over an arc of rotation of the virtual detent bezel device.

In Example 47, the subject matter of any one or more of Examples 42-46 optionally include wherein the output pattern provides a degree of rotation.

In Example 48, the subject matter of any one or more of Examples 42-47 optionally include wherein the output pattern provides a number of detents crossed.

In Example 49, the subject matter of any one or more of Examples 42-48 optionally include wherein the output pattern includes an application call-back.

In Example 50, the subject matter of Example 49 optionally includes wherein the application call-back is at least one of a horizontal scroll or a vertical scroll.

In Example 51, the subject matter of any one or more of Examples 49-50 optionally include wherein the application call-back is a zoom.

In Example 52, the subject matter of any one or more of Examples 42-51 optionally include means for sensing at least one of a click or a touch on the physical portion of the virtual detent bezel device and invoking an application call-back in response to the sensing to select a user interface element.

In Example 53, the subject matter of any one or more of Examples 42-52 optionally include wherein the physical portion of the virtual detent bezel device physically rotates with respect to a housing of a machine to which it is attached to receive the rotational action of the user.

In Example 54, the subject matter of any one or more of Examples 42-53 optionally include wherein the physical portion includes a display, and wherein receiving the configuration includes displaying a set of visual elements on the physical portion that correspond to detents in the detent pattern.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A virtual detent bezel device, the device comprising:
   an input interface to receive a configuration that specifies a detent pattern and an output pattern corresponding to the detent pattern, wherein the detent patter is irregular over an arc of rotation of the virtual detent bezel device;
   a bezel portion to sense a rotational action of a user interacting with a physical portion of the virtual detent bezel device, wherein the bezel portion is to sense at least one of a click or a touch on the physical portion of the virtual detent bezel device, wherein the physical portion is circular, and wherein the physical portion of the virtual detent bezel device is a touch surface that does not rotate, wherein a twisting movement on the touch surface simulates rotating the bezel portion;
   a comparator to:
      compare the rotational action to a present rotational position to determine a rotational change;
      threshold the rotational change against the detent pattern to determine that a detent is crossed; and
      invoke an application call-back in response to sensing the at least one of the click or the touch to select a user interface element;
   a driver to activate a haptic feedback device in response to determining that the detent is crossed, wherein the haptic feedback device is a vibrating motor that is not part of the bezel portion; and an output interface to output a portion of the output pattern corresponding to the detent that is crossed.

2. The device of claim 1, wherein the detent pattern includes at least two different degrees of detent, wherein a degree of detent corresponds to a haptic response from the haptic feedback device.

3. The device of claim 1, wherein the output pattern provides a degree of rotation.

4. The device of claim 1, wherein the output pattern provides a number of detents crossed.

5. The device of claim 1, wherein the output pattern includes an application call-back.

6. The device of claim 1, wherein the physical portion includes a display, and wherein receiving the configuration includes displaying a set of visual elements on the physical portion that correspond to detents in the detent pattern.

7. A method for a virtual detent bezel device, the method comprising:
receiving, at an input interface of a virtual detent bezel device, a configuration that specifies a detent pattern and an output pattern corresponding to the detent pattern, wherein the detent pattern is irregular over an arc of rotation of the virtual detent bezel device;
sensing a rotational action of a user interacting with a physical portion of the virtual detent bezel device, wherein the physical portion is circular, and wherein the physical portion of the virtual detent bezel device is a touch surface that does not rotate, wherein a twisting movement on the touch surface simulates rotating the bezel portion;
comparing the rotational action to a present rotational position to determine a rotational change;
thresholding the rotational change against the detent pattern to determine that a detent is crossed;
activating a haptic feedback device in response to determining that the detent is crossed, wherein the haptic feedback device is a vibrating motor that is not part of the bezel portion;
outputting, at an output interface of the virtual detent bezel device, a portion of the output pattern corresponding to the detent that is crossed;
sensing at least one of a click or a touch on the physical portion of the virtual detent bezel device; and
invoking an application call-back in response to the sensing to select a user interface element.

8. The method of claim 7, wherein the detent pattern includes at least two different degrees of detent, wherein a degree of detent corresponds to a haptic response from the haptic feedback device.

9. The method of claim 7, wherein the output pattern provides a degree of rotation.

10. The method of claim 7, wherein the output pattern provides a number of detents crossed.

11. The method of claim 7, wherein the output pattern includes an application call-back.

12. The method of claim 7, wherein the physical portion includes a display, and wherein receiving the configuration includes displaying a set of visual elements on the physical portion that correspond to detents in the detent pattern.

13. At least one non-transitory machine readable medium including instructions for a virtual detent bezel device, the instructions, when executed by a machine, cause the machine to perform operations comprising:
receiving, at an input interface of a virtual detent bezel device, a configuration that specifies a detent pattern and an output pattern corresponding to the detent pattern, wherein the detent pattern is irregular over an arc of rotation of the virtual detent bezel device;
sensing a rotational action of a user interacting with a physical portion of the virtual detent bezel device, wherein the physical portion is circular, and wherein the physical portion of the virtual detent bezel device is a touch surface that does not rotate, wherein a twisting movement on the touch surface simulates rotating the bezel portion;
comparing the rotational action to a present rotational position to determine a rotational change;
thresholding the rotational change against the detent pattern to determine that a detent is crossed;
activating a haptic feedback device in response to determining that the detent is crossed, wherein the haptic feedback device is a vibrating motor that is not part of the bezel portion;
outputting, at an output interface of the virtual detent bezel device, a portion of the output pattern corresponding to the detent that is crossed;
sensing at least one of a click or a touch on the physical portion of the virtual detent bezel device; and
invoking an application call-back in response to the sensing to select a user interface element.

14. The at least one non-transitory machine readable medium of claim 13, wherein the detent pattern includes at least two different degrees of detent, wherein a degree of 13 detent corresponds to a haptic response from the haptic feedback device.

15. The at least one non-transitory machine readable medium of claim 13, wherein the output pattern provides a degree of rotation.

16. The at least one non-transitory machine readable medium of claim 13, wherein the output pattern provides a number of detents crossed.

17. The at least one non-transitory machine readable medium of claim 13, wherein the output pattern includes an application call-back.

18. The at least one non-transitory machine readable medium of claim 13, wherein the physical portion includes a display, and wherein receiving the configuration includes displaying a set of visual elements on the physical portion that correspond to detents in the detent pattern.

* * * * *

UNITED STATES PATENT AND TRADEMARK OFFICE
CERTIFICATE OF CORRECTION

PATENT NO. : 10,928,782 B2
APPLICATION NO. : 16/061239
DATED : February 23, 2021
INVENTOR(S) : Mansour et al.

Page 1 of 1

It is certified that error appears in the above-identified patent and that said Letters Patent is hereby corrected as shown below:

In the Claims

Column 14, Line 45, Claim 1, delete "patter" and insert --pattern-- therefor

Column 16, Line 38, Claim 14, after "of", delete "13"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*